Dec. 10, 1929.  A. CHAGNAUD  1,738,563
RECORDING DEVICE FOR MEASURING INSTRUMENTS
Filed Oct. 16, 1928
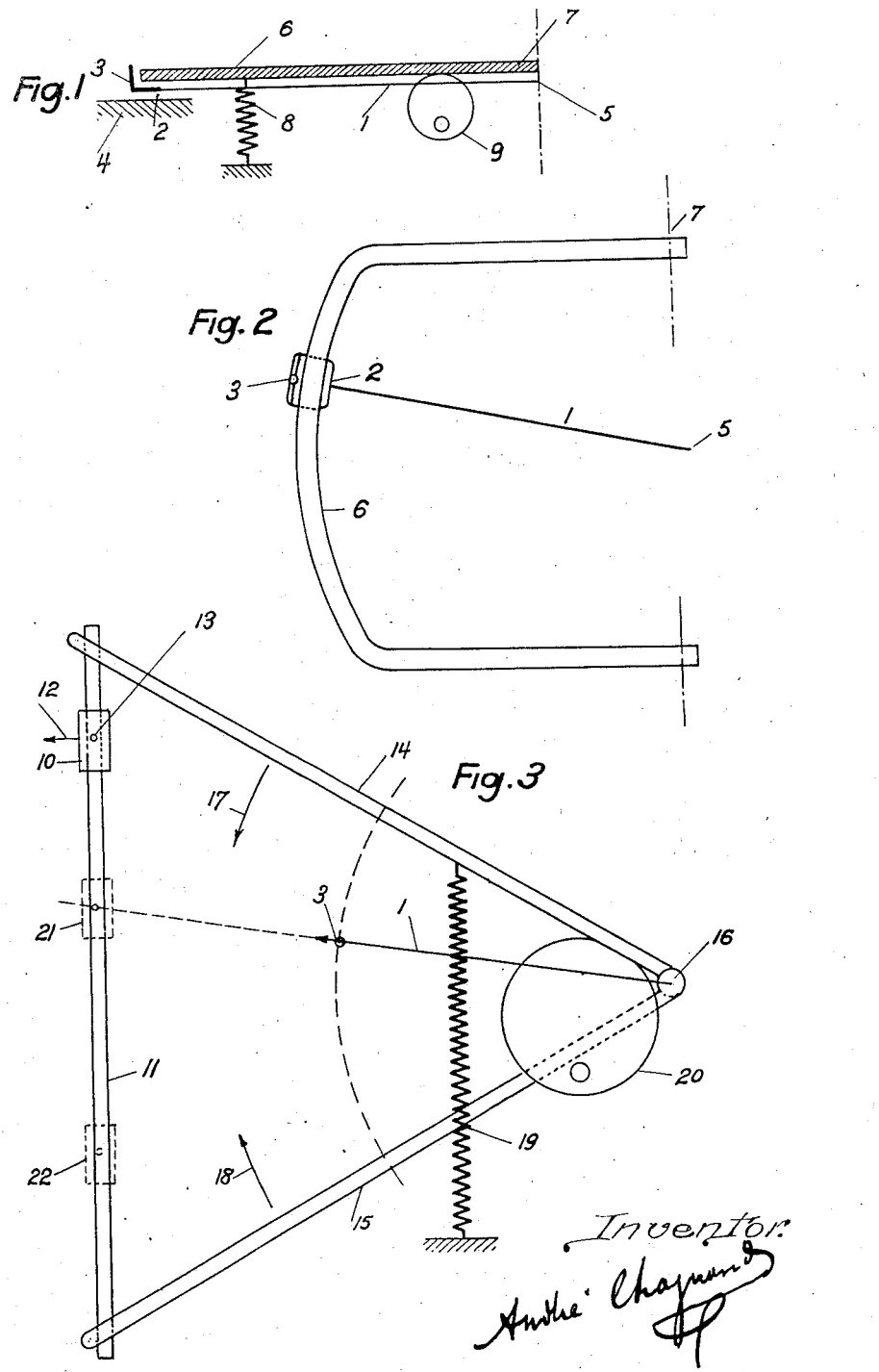
Inventor:
André Chagnaud Patented Dec. 10, 1929

1,738,563

UNITED STATES PATENT OFFICE

ANDRÉ CHAGNAUD, OF PARIS, FRANCE, ASSIGNOR TO SOCIETE DES USINES CHIMIQUES RHONE-POULENC, OF PARIS, FRANCE, A CORPORATION OF FRANCE

RECORDING DEVICE FOR MEASURING INSTRUMENTS

Application filed October 16, 1928, Serial No. 312,875, and in France October 29, 1927.

As is known in the art, the major portion of measuring apparatuses in which a pointer, by its deviation, indicates the variations in the phenomena which it is desired to study, are subject to the disadvantage that the said pointer is not given an impulse which is strong enough to cause the recording pen, placed on the extremity thereof, to directly trace a curve on the paper without completely overthrowing the indications which are being recorded.

It therefore becomes necessary to have recourse to recording by points, obtained by placing the pen in contact with the paper at predetermined intervals, the pointer remaining free during the rest of the time.

Such a way of proceeding has the disadvantages of causing deterioration of the pointer and the introduction of errors due to the discontinuity of the graph and particularly in the case of large variations or multiple recording.

Furthermore, it is frequently impossible to place a strong pen which has a sufficient supply of ink, on the end of the pointer. Removal of the pen for cleaning purposes risks deterioration of the pointer and the variation in weight of the pointer due to the successive diminution in quantity of ink has a very appreciable influence on the accuracy of the indications to be recorded.

Another disadvantage resides in the fact that in obtaining graphs of large dimensions, it is necessary to employ a very long pointer, which is frequently incongruous with respect to the operation and the construction of the apparatus.

My invention relates to a device of the type indicated in which recording takes place continuously and in which the pen is not carried by the pointer, which allows said pen complete freedom of movement and to be made as light and as short as desired. The graph obtained is furthermore an automatic amplification of the deviations of the pointer.

One of the objects of my invention is to provide such a device with an arrangement for periodically immobilizing the pointer by means of a stirrup control.

Another object is to provide the device with a pair of pivoted arms which are adapted to be displaced in a plane parallel to that of the pointer during immobilization thereof.

Still another object of my invention is to provide my device with a recording movable slide which is independent of the pointer and controlled by movable operating bars.

As will be subsequently shown, recording thus takes place at the desired point, and with an amplification which is a function of the distance from the slide to the axis of the pointer. It will also be shown that the displacements of the slide take place along a tangent parallel to the mean tangent of the arc through which the pointer is swung.

The invention will be more readily understood with reference to the accompanying drawing when taken in connection with the following description.

In the drawing—

Fig. 1 is a section through a device serving to immobilize the pointer at regular intervals;

Fig. 2 is a plan view of Fig. 1; and

Fig. 3 is a plan view of the recording mechanism.

Referring to the drawing more in detail, 1 indicates the pointer which carries at its extremity a member composed of a flat portion 2 and a small rod 3. The pointer moves about its shaft 5 over a fixed surface 4. The said member is the only surplus weight to which the pointer is subjected, which weight is of a constant quantity and the needle is made as short as desired.

A U-shaped bar 6 provided with an arcuate portion parallel to the path of the member 2—3 is adapted to oscillate on a shaft 7 which in Figs. 1 and 2 is horizontal.

Said bar 6 is urged in the downward direction by a spring 8, causing the same to bear on a cam 9. The said cam 9 is of suitable shape and is adapted to be rotated at a predetermined uniform speed.

The said U-shaped bar is disposed in a plane above that of the pointer and has its arcuate portion disposed above the member 2.

Obviously the cam and spring arrangement might be replaced by other suitable means for producing a periodic action.

Normally the bar 6 leaves the pointer 1 free to oscillate therebeneath. At certain instants, under the action of spring 8 and cam 9, the said bar bears against the member 2, which in turn enters into contact with the surface 4. The pointer thus becomes immobilized just at the instant where, under the action of the cam, the bar is raised. The same phenomena takes place at regular intervals.

During immobilization of the pointer, the flat part 2 thereof is caused to bear on the surface 4 which opposes all angular displacement.

Recording is established by means of a strong slide 10 (Fig. 3), adapted to freely slide along a rod 11, and carries a pen 12 provided with a supply of ink. The said slide is provided on its upper face with a small rod 13 similar to rod 3 provided on the extremity of pointer 1.

Two arms 14 and 15 are adapted to rotate about a shaft 16 coinciding with that of pointer 1. Arm 14 is urged by a spring in the direction of the arrow 17 and arm 15 is urged in the direction of the arrow 18 by a spring. For purposes of clearness, only the mechanism of arm 14 with its spring 19 has been illustrated in the figure. The arrangement is such that two similar cams 20, of suitable form, and turning at predetermined uniform speeds, cause the two arms to become displaced in the direction of the arrows under the action of springs 19.

When the pointer of the measuring apparatus is free, the arms 14 and 15 are in the position indicated in the figure. At the instant the pointer is immobilized they are set in motion. Subsequently the arm 14 meets the pin 13, drives along the slide 10 and abuts against the rod 3 of the pointer, the slide occupying at this instant the position shown in dotted lines at 21, which is a function of that of the pointer. The shaft 5, the rod 3 and the rod 13 are thus in the same straight line. During this time the arm 15 also abuts against the rod 3. The cams 20 continue their movement and cause arms 14 and 15 to leave the rod 3 and return to their initial position.

The movement of the cam 9 is adjusted in such a way that the pointer is not released until 14 and 15 have reached the end of their stroke.

From the foregoing it will be obvious that if the slide had originally been in the position 22, it would have been brought back to the correct position 21 by the arm 15 instead of the arm 14.

The pen 12 therefore traces a continuous curve. The cam 9 is turned fast enough so that the amount of paper displaced between immobilization points will not be very appreciable. If such were not the case, the pen would trace a line between two displacements of the slide and a step curve would be obtained, which in some cases would not be found objectionable. In any event, it is necessary that the pointer has enough time to take its correct position between two immobilization points.

The control of the pointer 1 and arms 14—15 as well as the displacement of the paper are preferably brought about synchronously in a way to establish the conditions indicated. This feature forms no particular part of the present invention and therefore need not be described in detail.

An inspection of Fig. 3 will reveal the fact that the displacement of slide 10 is an amplification of the movement of the pointer on the tangent of the arc followed thereby.

It frequently happens that in galvanometrical graduations, for example, the intervals between lines are larger at the center of the dial than at the extremities. My improved device corrects this irregularity as the amplification is greater at the center than at the extremities.

It is to be understood that the slide 10 may be utilized to make automatic adjustments by means of suitable stops or contacts disposed in the path thereof and the strength thereof will allow actuating most any device desired for accomplishing this result.

From the foregoing it will be obvious that my device lends itself readily to use in connection with all sorts of measuring instruments such as, galvanometers, pyrometers, ammeters, vacuum gauges and the like no matter how short the pointer may be. Many other uses for my device will naturally suggest themselves.

Having thus described my invention what I claim as new and desire to secure by Letters Patent is:

1. In a recording device of the type described, an oscillatively mounted pointer, a U-shaped bar oscillatively mounted above said pointer, a stop plate on said pointer, an aligning pin on said stop plate engaging said U-shaped bar, and means for causing said U-shaped bar to periodically descend on said stop plate for the purpose disclosed.

2. In a recording device of the type described, an oscillatively mounted pointer, a U-shaped bar oscillatively mounted above said pointer, a stop plate on said pointer, an aligning pin on said stop plate engaging said U-shaped bar, an operating cam disposed beneath said U-shaped bar and a spring adapted to urge said U-shaped bar against said operating cam for the purpose disclosed.

3. In a recording device of the type described, an oscillatively mounted pointer, a U-shaped bar oscillatively mounted above said pointer, a stop plate on said pointer, an aligning pin on said stop plate engaging said U-shaped bar, means for causing said U-shaped bar to periodically descend on said stop plate, a pair of arms pivotally mounted on the axis of said pointer, and means for causing said arms to align with said pointer and abut said aligning pin each time said U-shaped bar descends on said stop plate for the purpose disclosed.

4. In a recording device of the type described, an oscillatively mounted pointer, a U-shaped bar oscillatively mounted above said pointer, a stop plate on said pointer, an aligning pin on said stop plate engaging said U-shaped bar, an operating cam disposed beneath said U-shaped bar, a spring adapted to urge said U-shaped bar against said operating cam, a pair of arms pivotally mounted on the axis of said pointer, and means for causing said arms to align with said pointer and abut said aligning pin each time said U-shaped bar descends on said stop plate for the purpose disclosed.

5. In a recording device of the type described, an oscillatively mounted pointer, a U-shaped bar oscillatively mounted above said pointer, a stop plate on said pointer, an aligning pin on said stop plate engaging said U-shaped bar, means for causing said U-shaped bar to periodically descend on said stop plate, a pair of arms pivotally mounted on the axis of said pointer, an operating cam for each of said arms, and a spring for each of said arms adapted to urge said arms against their respective cams, said cams being adapted to cause said arms to align with said pointer and abut said aligning pin each time said U-shaped bar descends on said stop plate for the purpose disclosed.

6. In a recording device of the type described, an oscillatively mounted pointer, a U-shaped bar oscillatively mounted above said pointer, a stop plate on said pointer, an aligning pin on said stop plate engaging said U-shaped bar, an operating cam disposed beneath said U-shaped bar, a spring adapted to urge said U-shaped bar against said operating cam, a pair of arms pivotally mounted on the axis of said pointer, an operating cam for each of said arms, and a spring for each of said arms adapted to urge said arms against their respective cams, said last mentioned cams being adapted to cause said arms to align with said pointer and abut said aligning pin each time said U-shaped bar descends on said stop plate under the action of said first mentioned cam for the purpose disclosed.

7. In a recording device of the type described, an oscillatively mounted pointer, a U-shaped bar oscillatively mounted above said pointer, a stop plate on said pointer, an aligning pin on said stop plate engaging said U-shaped bar, means for causing said U-shaped bar to periodically descend on said stop plate, a pair of arms pivotally mounted on the axis of said pointer, means for causing said arms to align with said pointer and abut said aligning pin each time said U-shaped bar descends on said stop plate, a guide bar disposed in a position parallel to the mean tangent of the arc described by said pointer, a recording slide mounted on said guide bar, and means on said slide extending into the path of travel of said arms for the purpose disclosed.

8. In a recording device of the type described, an oscillatively mounted pointer, a U-shaped bar oscillatively mounted above said pointer, a stop plate on said pointer, an aligning pin on said stop plate engaging said U-shaped bar, means for causing said U-shaped bar to periodically descend on said stop plate, a pair of arms pivotally mounted on the axis of said pointer, means for causing said arms to align with said pointer and abut said stop plate, a guide bar disposed in a position parallel to the mean tangent of the arm described by said pointer, a recording slide mounted on said guide bar, and a pin on said slide extending into the path of travel of said arms for the purpose disclosed.

9. In a recording device of the type described, an oscillatively mounted pointer, a U-shaped bar oscillatively mounted above said pointer, a stop plate on said pointer, an aligning pin on said stop plate engaging said U-shaped bar, an operating cam disposed beneath said U-shaped bar, a spring adapted to urge said U-shaped bar against said operating cam, a pair of arms pivotally mounted on the axis of said pointer, means for causing said arms to align with said pointer and abut said aligning pin each time said U-shaped bar descends on said stop plate, a guide bar disposed in a position parallel to the mean tangent of the arc described by said pointer, a recording slide mounted on said guide bar, and means on said slide extending into the path of travel of said arms for the purpose disclosed.

10. In a recording device of the type described, an oscillatively mounted pointer, a U-shaped bar oscillatively mounted above said pointer, a stop plate on said pointer, an aligning pin on said stop plate engaging said U-shaped bar, an operating cam disposed beneath said U-shaped bar, a spring adapted to urge said U-shaped bar against said operating cam, a pair of arms pivotally mounted on the axis of said pointer, means for causing said arms to align with said pointer and abut said aligning pin each time said U-shaped bar descends on said stop plate, a guide bar disposed in a position parallel to the mean tangent of the arc described by said pointer, a recording slide mounted on said guide bar, and a pin on said slide extending into the path of travel of said arms for the purpose disclosed.

11. In a recording device of the type described, an oscillatively mounted pointer, a U-shaped bar oscillatively mounted above said pointer, a stop plate on said pointer, an aligning pin on said stop plate engaging said U-shaped bar, means for causing said U-shaped bar to periodically descend on said stop plate, a pair of arms pivotally mounted on the axis of said pointer, an operating cam for each of said arms, a spring for each of said arms adapted to urge said arms against their respective cams, said cams being adapted to cause said arms to align with said pointer and abut said aligning pin each time said U-shaped bar descends on said stop plate, a guide bar disposed in a position parallel to the mean tangent of the arc described by said pointer, a recording slide mounted on said guide bar, and means on said slide extending into the path of travel of said arms for the purpose disclosed.

12. In a recording device of the type described, an oscillatively mounted pointer, a U-shaped bar oscillatively mounted above said pointer, a stop plate on said pointer, an aligning pin on said stop plate engaging said U-shaped bar, means for causing said U-shaped bar to periodically descend on said stop plate, a pair of arms pivotally mounted on the axis of said pointer, an operating cam for each of said arms, a spring for each of said arms adapted to urge said arms against their respective cams, said cams being adapted to cause said arms to align with said pointer and abut said aligning pin each time said U-shaped bar descends on said stop plate, a guide bar disposed in a position parallel to the mean tangent of the arc described by said pointer, a recording slide mounted on said guide bar, and a pin on said slide extending into the path of travel of said arms for the purpose disclosed.

13. In a recording device of the type described, an oscillatively mounted pointer, a U-shaped bar oscillatively mounted above said pointer, a stop plate on said pointer, an aligning pin on said stop plate engaging said U-shaped bar, an operating cam disposed beneath said U-shaped bar, a spring adapted to urge said U-shaped bar against said operating cam, a pair of arms pivotally mounted on the axis of said pointer, an operating cam for each of said arms, a spring for each of said arms adapted to urge said arms against their respective cams, said last mentioned cams being adapted to cause said arms to align with said pointer and abut said aligning pin each time said U-shaped bar descends on said stop plate under the action of said first mentioned cam, a guide bar disposed in a position parallel to the mean tangent of the arc described by said pointer, a recording slide mounted on said guide bar, and means on said slide extending into the path of travel of said arms for the purpose disclosed.

14. In a recording device of the type described, an oscillatively mounted pointer, a U-shaped bar oscillatively mounted above said pointer, a stop plate on said pointer, an aligning pin on said stop plate engaging said U-shaped bar, an operating cam disposed beneath said U-shaped bar, a spring adapted to urge said U-shaped bar against said operating cam, a pair of arms pivotally mounted on the axis of said pointer, an operating cam for each of said arms, a spring for each of said arms adapted to urge said arms against their respective cams, said last mentioned cams being adapted to cause said arms to align with said pointer and abut said aligning pin each time said U-shaped bar descends on said stop plate under the action of said first mentioned cam, a guide bar disposed in a position parallel to the mean tangent of the arc described by said pointer, a recording slide mounted on said guide bar, and a pin on said slide extending into the path of travel of said arms for the purpose disclosed.

In testimony whereof I hereunto affix my signature.

ANDRÉ CHAGNAUD.